United States Patent
Bruhn et al.

(10) Patent No.: US 9,595,124 B2
(45) Date of Patent: Mar. 14, 2017

(54) ADDING USER-SELECTED MARK-UPS TO A VIDEO STREAM

(71) Applicant: Robert Bosch GmbH, Stuttgart (DE)

(72) Inventors: Oliver Bruhn, Newmanstown, PA (US); Scott Canupp, West Reading, PA (US); Brad Eck, Lititz, PA (US); Ajit Belsarkar, Lancaster, PA (US)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 14/176,434

(22) Filed: Feb. 10, 2014

(65) Prior Publication Data
US 2014/0225921 A1    Aug. 14, 2014

Related U.S. Application Data

(60) Provisional application No. 61/762,696, filed on Feb. 8, 2013.

(51) Int. Cl.
*H04N 21/4722* (2011.01)
*G06T 11/60* (2006.01)
*G11B 27/00* (2006.01)
*H04N 7/18* (2006.01)

(52) U.S. Cl.
CPC ............... *G06T 11/60* (2013.01); *G11B 27/00* (2013.01); *H04N 7/183* (2013.01)

(58) Field of Classification Search
CPC .................................................. H04N 21/4722
See application file for complete search history.

(56) References Cited

U.S. PATENT DOCUMENTS

| | | | | |
|---|---|---|---|---|
| 5,652,849 A | * | 7/1997 | Conway | G08B 25/14 348/115 |
| 5,848,425 A | * | 12/1998 | Lowry | G06F 17/246 707/999.202 |
| 8,717,436 B2 | * | 5/2014 | Heminghous | H04N 21/21805 348/143 |
| 8,812,713 B1 | * | 8/2014 | McConnell | H04N 21/4122 709/203 |

(Continued)

FOREIGN PATENT DOCUMENTS

| | | |
|---|---|---|
| CN | 102915638 | 2/2013 |
| KR | 100970278 | 7/2010 |
| WO | 2012/151651 | 11/2012 |

OTHER PUBLICATIONS

Klippgen et al., "The Use of Metadata for the Rendering of Personalized Video Delivery," Multimedia Data Management, 1998, 31 pages.

(Continued)

*Primary Examiner* — Jacinta M Crawford
*Assistant Examiner* — Phong Nguyen
(74) *Attorney, Agent, or Firm* — Michael Best & Friedrich LLP

(57) ABSTRACT

Methods and systems for adding a mark-up to a video stream. One method includes receiving, with a computing device, a video stream from an image sensor and metadata associated with at least one mark-up. The method also includes processing, with the computing device, the metadata to generate the at least one mark-up for the video stream and displaying the at least one mark-up overlaid on the video stream.

18 Claims, 13 Drawing Sheets
(10 of 13 Drawing Sheet(s) Filed in Color)

(56) References Cited

U.S. PATENT DOCUMENTS

| | | | |
|---|---|---|---|
| 2002/0075307 A1* | 6/2002 | Alexander | H04L 29/06 715/760 |
| 2004/0105570 A1* | 6/2004 | Venetianer | G06K 9/00778 382/100 |
| 2007/0162850 A1* | 7/2007 | Adler | G06F 9/4443 715/700 |
| 2008/0106594 A1* | 5/2008 | Thrun | G06F 17/30817 348/39 |
| 2009/0315712 A1* | 12/2009 | Bloemendaal | G08B 13/1672 340/541 |
| 2009/0319571 A1* | 12/2009 | Johnson | G06F 17/30781 |
| 2010/0124356 A1* | 5/2010 | Hampapur | G06K 9/00778 382/103 |
| 2010/0204914 A1* | 8/2010 | Gad | G01C 21/36 701/533 |
| 2010/0208064 A1 | 8/2010 | Liu et al. | |
| 2010/0329642 A1* | 12/2010 | Kam | G06F 3/04817 386/280 |
| 2011/0010093 A1* | 1/2011 | Partridge | G01S 5/0252 701/300 |
| 2011/0041169 A1* | 2/2011 | De Luca | G06F 3/04817 726/7 |
| 2011/0043627 A1* | 2/2011 | Werling | G06T 19/006 348/143 |
| 2011/0165917 A1 | 7/2011 | Taylor | |
| 2011/0216167 A1 | 9/2011 | Katz et al. | |
| 2011/0262103 A1* | 10/2011 | Ramachandran | H04N 5/44591 386/240 |
| 2012/0008916 A1* | 1/2012 | Lane | G11B 27/034 386/241 |
| 2012/0057640 A1 | 3/2012 | Shi et al. | |
| 2012/0092492 A1* | 4/2012 | Carbonell | G06Q 30/02 348/143 |
| 2012/0197464 A1* | 8/2012 | Wang | B25J 9/1689 701/2 |
| 2012/0307052 A1* | 12/2012 | Thiruvengada | H04N 7/183 348/143 |
| 2012/0307053 A1* | 12/2012 | Thiruvengada | G06F 3/04817 348/143 |
| 2012/0321273 A1 | 12/2012 | Messmer | |
| 2012/0330952 A1 | 12/2012 | Kong et al. | |
| 2013/0019268 A1* | 1/2013 | Fitzsimmons | H04N 21/2542 725/60 |
| 2013/0141573 A1* | 6/2013 | Sutter | H04N 7/183 348/143 |
| 2013/0201327 A1* | 8/2013 | M | H04N 7/181 348/143 |
| 2013/0265426 A1* | 10/2013 | Fan | G07B 15/02 348/148 |
| 2014/0078397 A1* | 3/2014 | Bloch | H04N 21/845 348/512 |

OTHER PUBLICATIONS

"Axis Expects Only 15% Growth?" IPVM, accessed at least as early as Dec. 16, 2013 <URL: http://ipvm.com/forums/forums/video-surveillance/topics/axis-investor-relations-release-market-expected-to-grow-at-15-p-a>.

Axis Communications Solutions, Compatible Applications, accessed at least as early as Dec. 16, 2013 <URL: http://www.axis.com/en/products/video/compatible_applications/index.php>.

International Search Report and Written Opinion for Application No. PCT/US2014/015525 dated Apr. 15, 2014 (9 pages).

\* cited by examiner

… (1) …

ADDING USER-SELECTED MARK-UPS TO A VIDEO STREAM

RELATED APPLICATIONS

This application claims priority to U.S. Provisional Patent Application No. 61/762,696, filed Feb. 8, 2013, the entire content of which is hereby incorporated by reference.

FIELD

Embodiments of the invention relate to streaming user-customized video metadata. In particular, embodiments of the invention relate to software applications that provide augmented reality viewing that allows a user to draw on or mark-up a viewing screen and make the mark-ups persistent even as the viewing screen refreshes.

BACKGROUND

Security cameras capture and transmit video. For fixed cameras, the transmitted video generally corresponds to the same field-of-view ("FoV"). However for a pan, tilt, and zoom ("PTZ") camera, the FoV is not constant. Rather, PTZ cameras are configured to provide video at different points in space. Conventional security surveillance cameras transmit video with limited metadata providing information such as text information for sector or location information and preset titles (e.g., "Back Door").

Conventional video security systems also provide non-interactive data streams that offer limited ability for a user to interrogate the video feed for additional information. In addition, video analytics has limited functionality and is developed in a top-down manner from developer to user.

SUMMARY

Accordingly, embodiments of the invention provide methods and systems that allow a user to insert, transmit, and render information in the form of mark-ups on a video stream, such as security surveillance. For example, embodiments of the invention allow users to draw on a viewing screen (e.g., with a stylus) or add a live feature to a viewing screen that measures something, such as timers (hereinafter collectively referred to as "mark-ups"). The user-selected mark-ups define the metadata provided by security cameras or other sources. Accordingly, embodiments of the invention provide methods and system that encode, store in a data stream, and decode metadata used to generate and display the user-selected mark-ups. The mark-ups provide video analytics for the video stream and remain and refresh as the video stream references (i.e., as the associated metadata refreshes).

One embodiment of the invention provides a method for adding a mark-up to a video stream. The method includes receiving, with a computing device, a video stream from an image sensor and metadata associated with at least one mark-up. The method also includes processing, with the computing device, the metadata to generate the at least one mark-up for the video stream and displaying the at least one mark-up overlaid on the video stream.

Another embodiment of the invention provides a system for adding a mark-up to a video stream. The system includes a computing device that a processing unit configured to execute a software application. The software application, when executed, is configured to receive a video stream from an image sensor, receive metadata associated with at least one mark-up, process the metadata to generate the at least one mark-up for the video stream, and display the at least one mark-up overlaid on the video stream.

Other aspects of the invention will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1b schematically illustrates the computing device included in the system of FIG. 1a.

FIG. 2 illustrates a video stream displayed on the computing device of FIG. 1a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "controllers" and "control units" described in the specification can include standard processing components, such as one or more processors, one or more non-transitory computer-readable medium modules, one or more input/output interfaces, and various connections (e.g., a system bus) connecting the components.

Figure 1A:
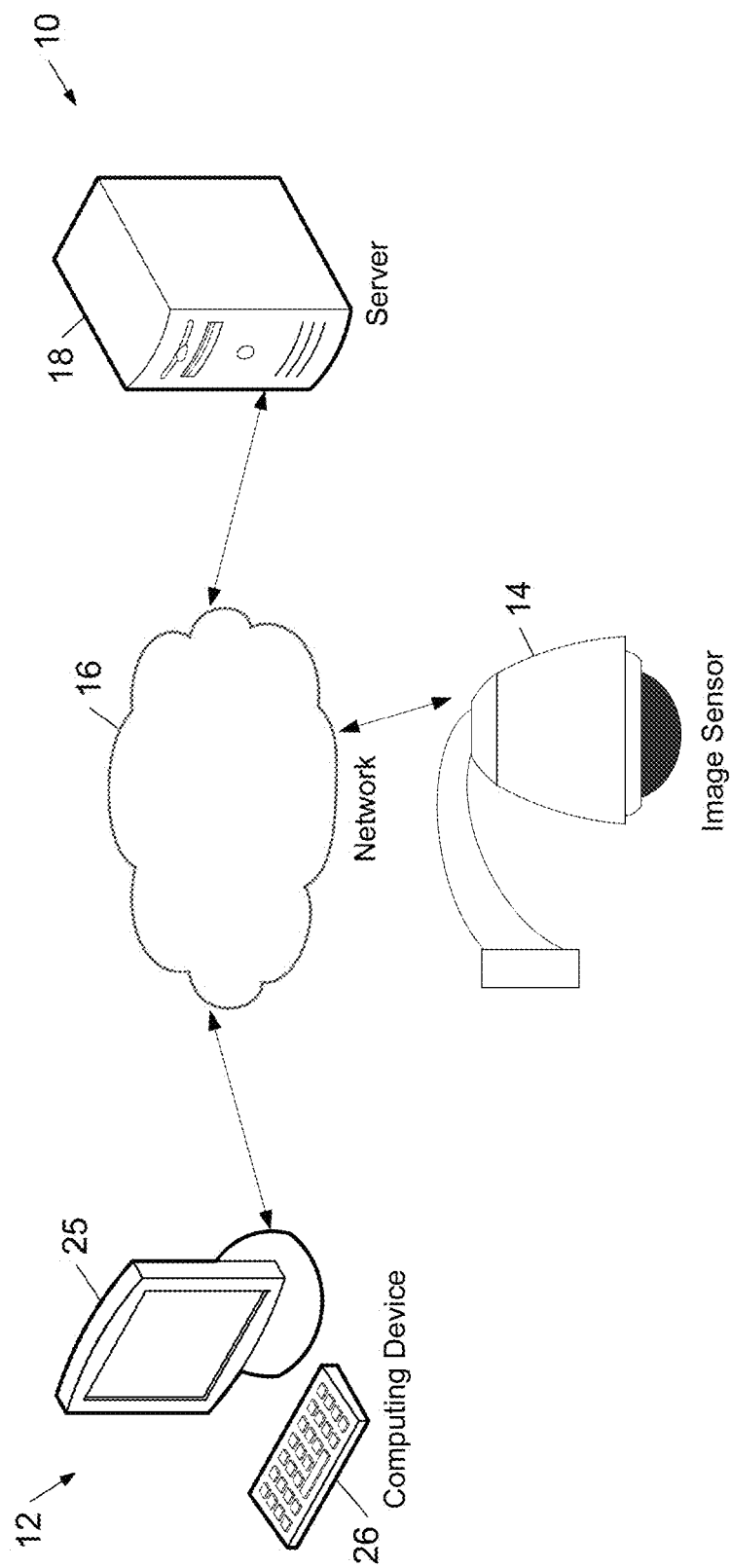
FIG. 1a schematically illustrates a system for adding user-selected mark-ups to a video stream.

FIG. 1a schematically illustrates a system 10 for monitoring a video stream. The system 10 includes a computing device 12 (also referred to as a "client" device in the present application). The system 10 also includes an image sensor 14, such as a still or video camera. The image sensor 14 can have a fixed field-of-view ("FoV") or a changing FoV. For example, in some embodiments, the image sensor 14 includes a pan, tilt, and zoom ("PTZ") video camera. The image sensor 14 monitors an area for surveillance purposes.

The computing device 12 communicates with the image sensor 14 over at least one network 16. The network 16 can include a wired network, a wireless network, or a combination thereof. For example, the network 16 can include the Internet, a local area network, or a wide area network.

As illustrated in FIG. 1a, the system 10 can also include a server 18 (e.g., a remote server) that stores one or more software applications (i.e., "apps" or "gadgets") that can be downloaded to the computing device 12 over the network 16. Therefore, in some embodiments, the server 18 is referred to as an "App Store." It should be understood that although only a single computing device 12, image sensor 14, and server 18 are illustrated in FIG. 1a, the system 10 can include multiple image sensors 14, multiple computing devices 12, and/or multiple servers 18.

Figure 1B:
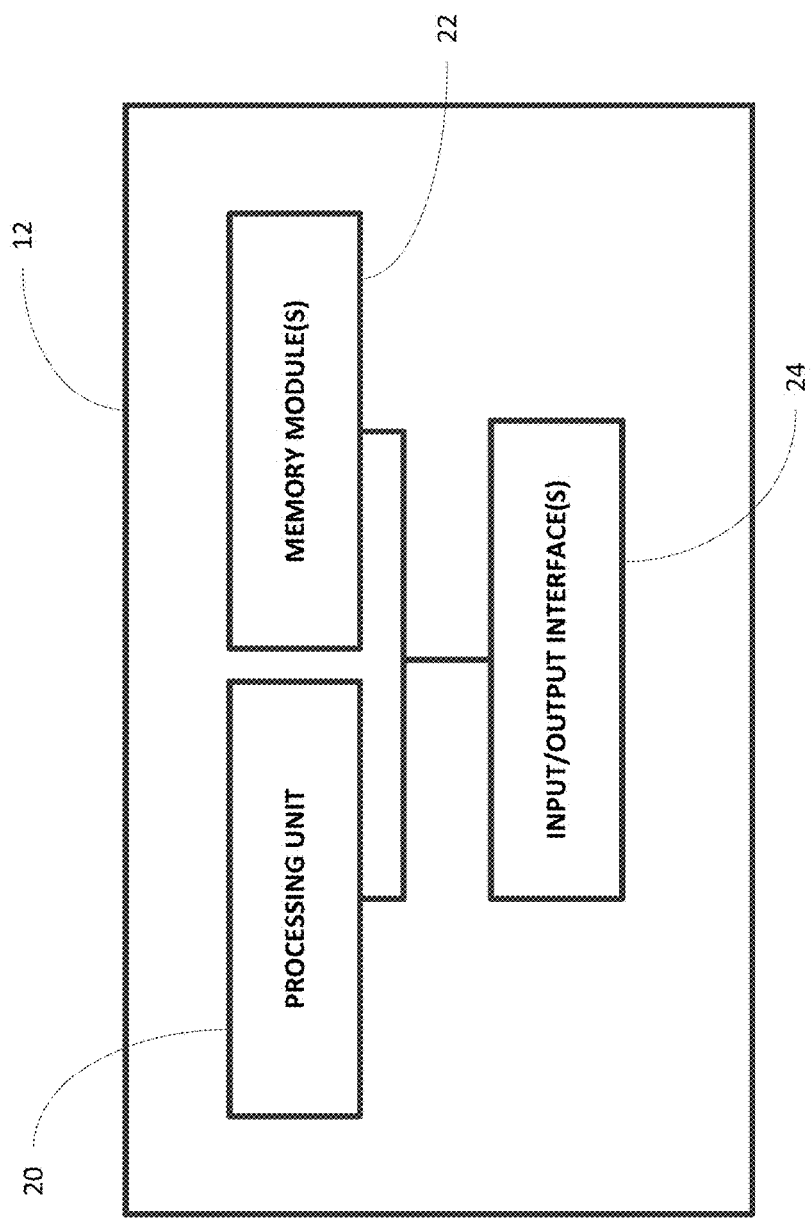

The computing device 12 can include a desktop computer, a laptop computer, a tablet computer, a smart phone, a smart watch, a smart television, or any device that allows a user to view video data streamed from one or more image sensors 14 (also referred to as "image sources"). As illustrated in FIG. 1b, the computing device 12 can be configured in a number of different ways and can include a processing unit 20 (e.g., a microprocessor, an application specific integrated circuit ("ASIC"), etc.), one or more memory modules 22, and one or more input/output interfaces 24.

The memory module 22 includes non-transitory computer-readable medium, such as random-access memory ("RAM") and/or read-only memory ("ROM"). The processing unit 20 retrieves instructions from the memory module 22 and executes the instructions to perform particular functionality as described in more detail below. The processing unit 20 can also retrieve and store data to the memory module 22 as part of executing the instructions.

The processing unit 20 also obtains data from external devices and systems through the input/output interface 24. For example, the input/output interface 24 connects the computing device 12 with the image sensor 14 and the server 18. The input/output interface 24 also allows the computing device 12 to interface with a user. For example, as illustrated in FIG. 1a, the computing device 12 also includes a monitor 25 that displays a video stream. In some embodiments, the monitor includes a touchscreen. The computing device 12 can also include one or more peripheral devices 26, such as a keyboard, joystick, mouse, stylus, printer, etc. These devices can be connected to and interface with the computing device 12 through the input/output interface 24.

Figure 2:
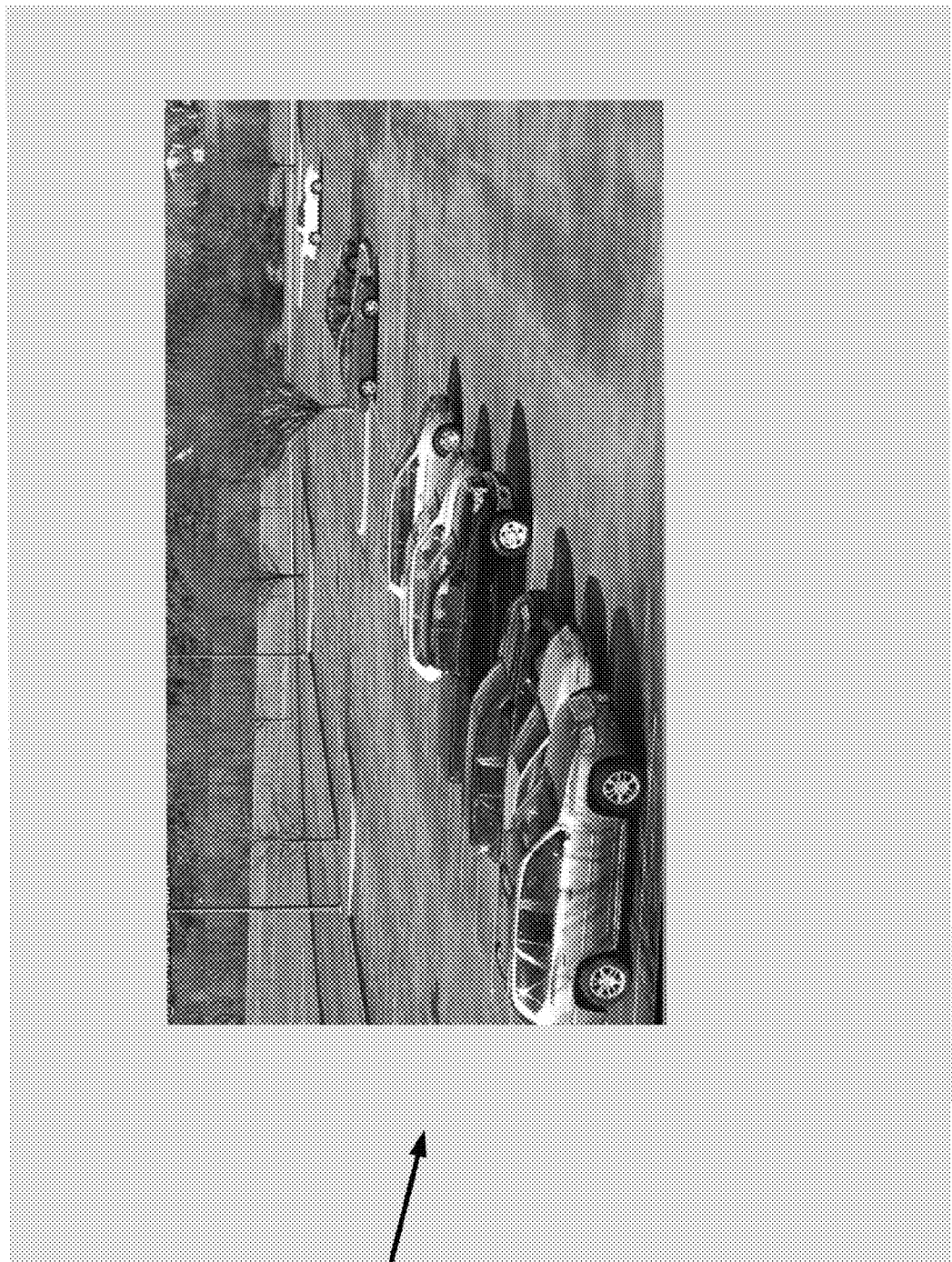

The computing device 12 receives data from the image sensor 14 over the network 16. The received data includes video data and metadata. The metadata can include any type of data, including video data, audio data, non-video data, non-audio data, and combinations thereof. For example, the metadata can include a current position of the image sensor 14 (e.g., pan and tilt positions), video analytics, parameters of the image sensor 14 (e.g., focus, iris, zoom), supplemental sensor information, and other information, such as text (e.g., a description of the image sensor 14, such as "CAMERA1" or "BACKDOOR"), time, date, etc. The supplemental sensor information can be provided by one or more sensors associated with the image sensor 14 (e.g., included in the same housing or device as the image sensor 14 other otherwise in communication with the image sensor 14 and/or the computing device 12. The sensors can sense various parameters of the area monitored by the image sensor 14. For example, the sensors can include gyroscope or accelerometer feedback received from accelerometer sensors and/or environmental, radiological, and biological sensors, such as gas sensors sensing the pollution level, radiation sensors sensing a radiation level, and positional sensors (e.g., GPS sensors or devices). FIG. 2 illustrates a video stream 28 displayed by the computing device 12 based on data received from an image sensor 14.

Figure 3:
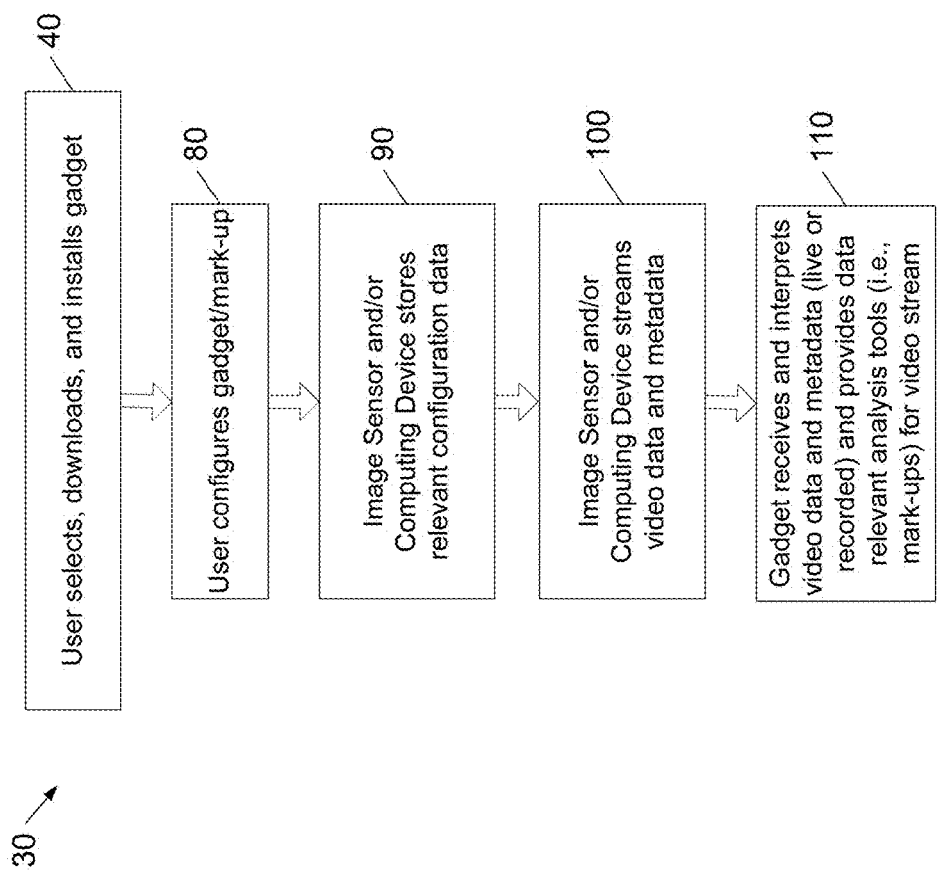
FIG. 3 illustrates a method of adding user-selected mark-ups to a video stream.
Figure 4:
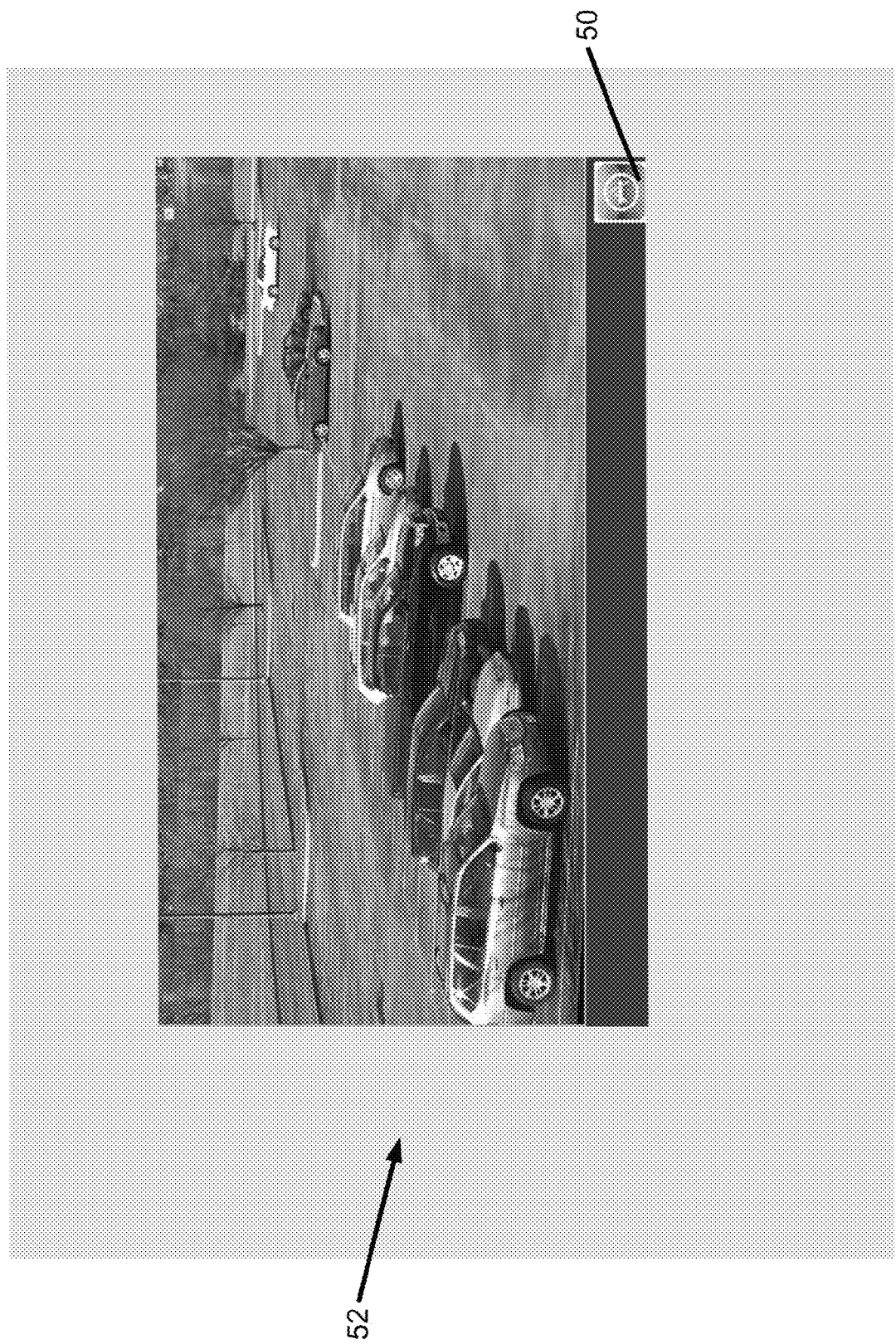
FIG. 4 illustrates a video stream and an icon for accessing a website for downloading applications for adding mark-ups to the video stream.
Figure 5:
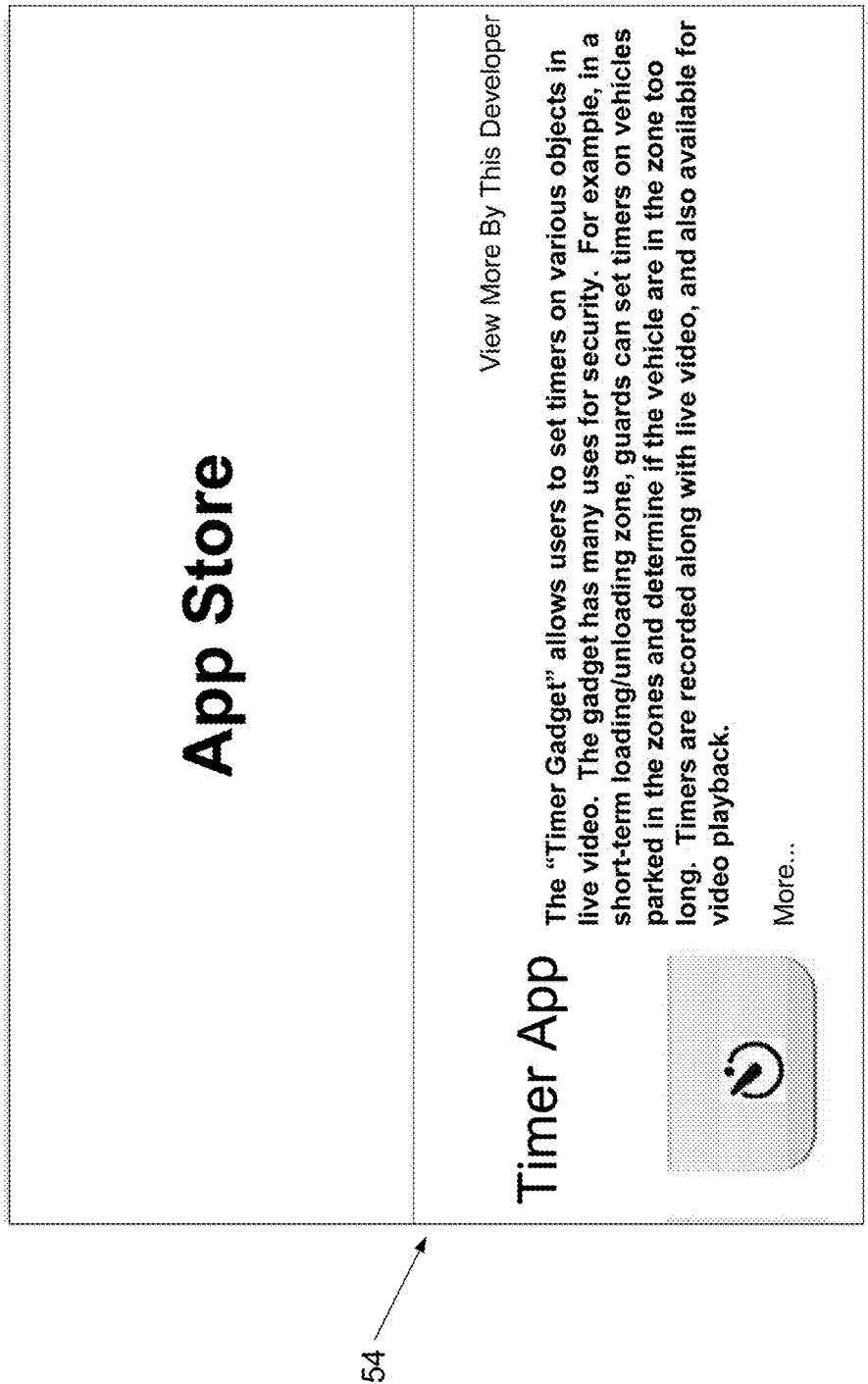
FIGS. 5 and 6 illustrate a website for downloading applications for adding mark-ups to a video stream.
Figure 6:
Figure 7:
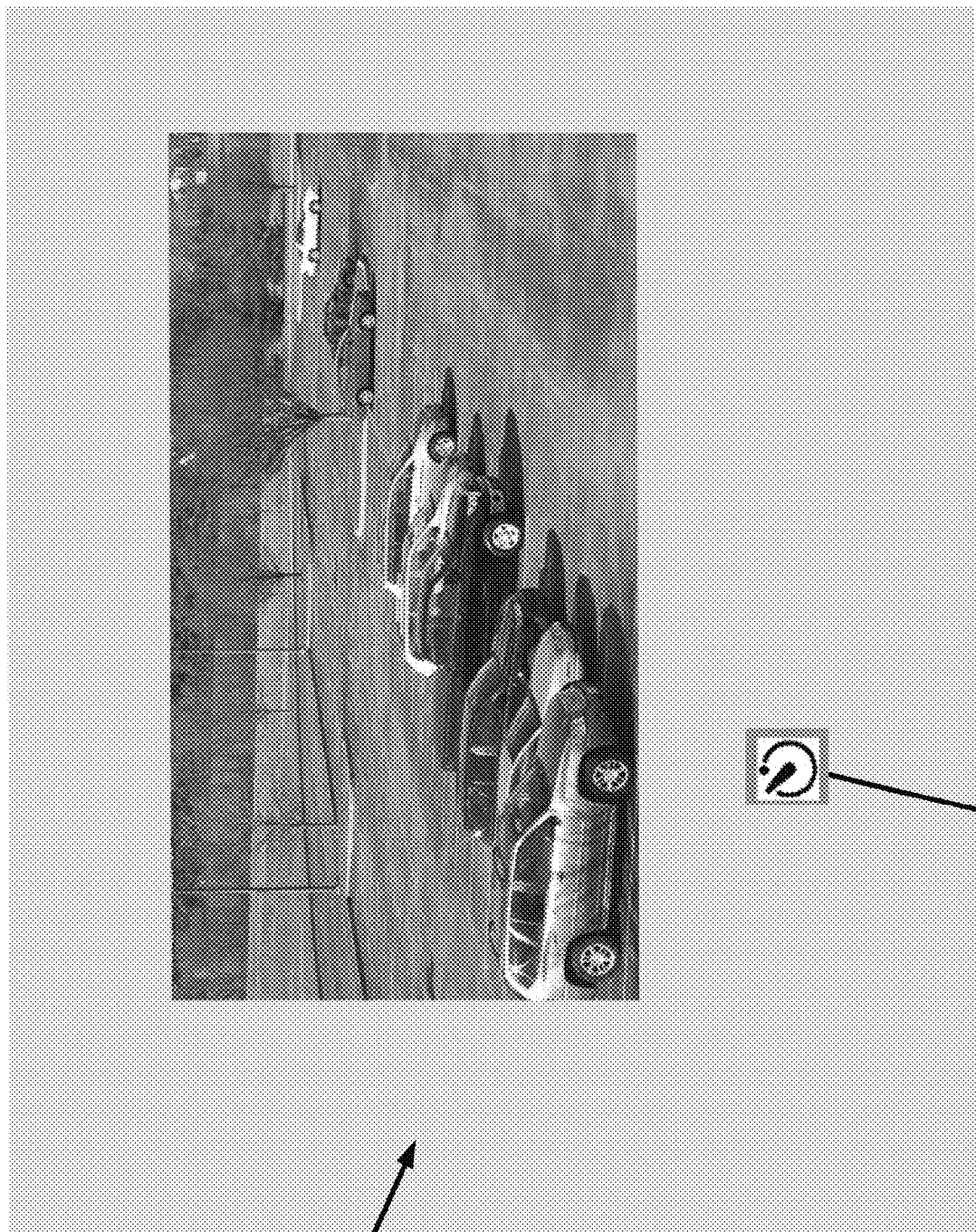
FIG. 7 illustrates a video stream and an icon for adding a mark-up to the video stream.

As noted above, embodiments of the invention allow a user to draw or add mark-ups to a video stream. The mark-ups provide additional metadata regarding the video stream and can be used to perform video analytics. For example, FIG. 3 illustrates a method 30 of adding mark-ups to a video stream according to one embodiment of the invention. As illustrated in FIG. 3, the method includes selecting, downloading, and installing a gadget on the computing device 12 (at block 40). In some embodiments, the gadget is downloaded from the server 18. For example, as illustrated in FIG. 4, to select and download a gadget, the computing device 12 displays an icon 50 (e.g., below the displayed video stream 52). A user can select (e.g., click, touch, tap, swipe, etc.) the icon 50 to access a website where the user can download one or more applications or gadgets (e.g., an application or "app" store accessible through the server 18 over the Internet from a uniform resource identifier ("URI")). For example, as illustrated in FIGS. 5 and 6, if a user selects the icon 50, the user can be directed to a website 54 hosted by the server 18. The website allows the user to select one or more gadgets for download (and pay for such selected gadgets as applicable). After selecting and downloading a gadget, the computing device 12 displays a gadget icon 70, as illustrated in FIG. 7. The gadget icon 70 represents a timer gadget that allows a user to add a timer mark-up to a displayed video stream. Timer mark-ups are described in more detail below.

It should be understood that other download and installation mechanisms can be used to download or install one or more gadgets on the computing device 12. For example, as an alternative to or in addition to downloading gadgets from the server 18, gadgets can be installed from a flash drive or removable memory module connectable to the computing device 12 (e.g., over a USB interface). Alternatively, one or more gadgets can be pre-installed on the computing device 12. For example, in some embodiments, a tablet, laptop, or personal computer can be specifically configured and sold for use with video streams and is pre-installed with a library of available gadgets.

Figure 8:
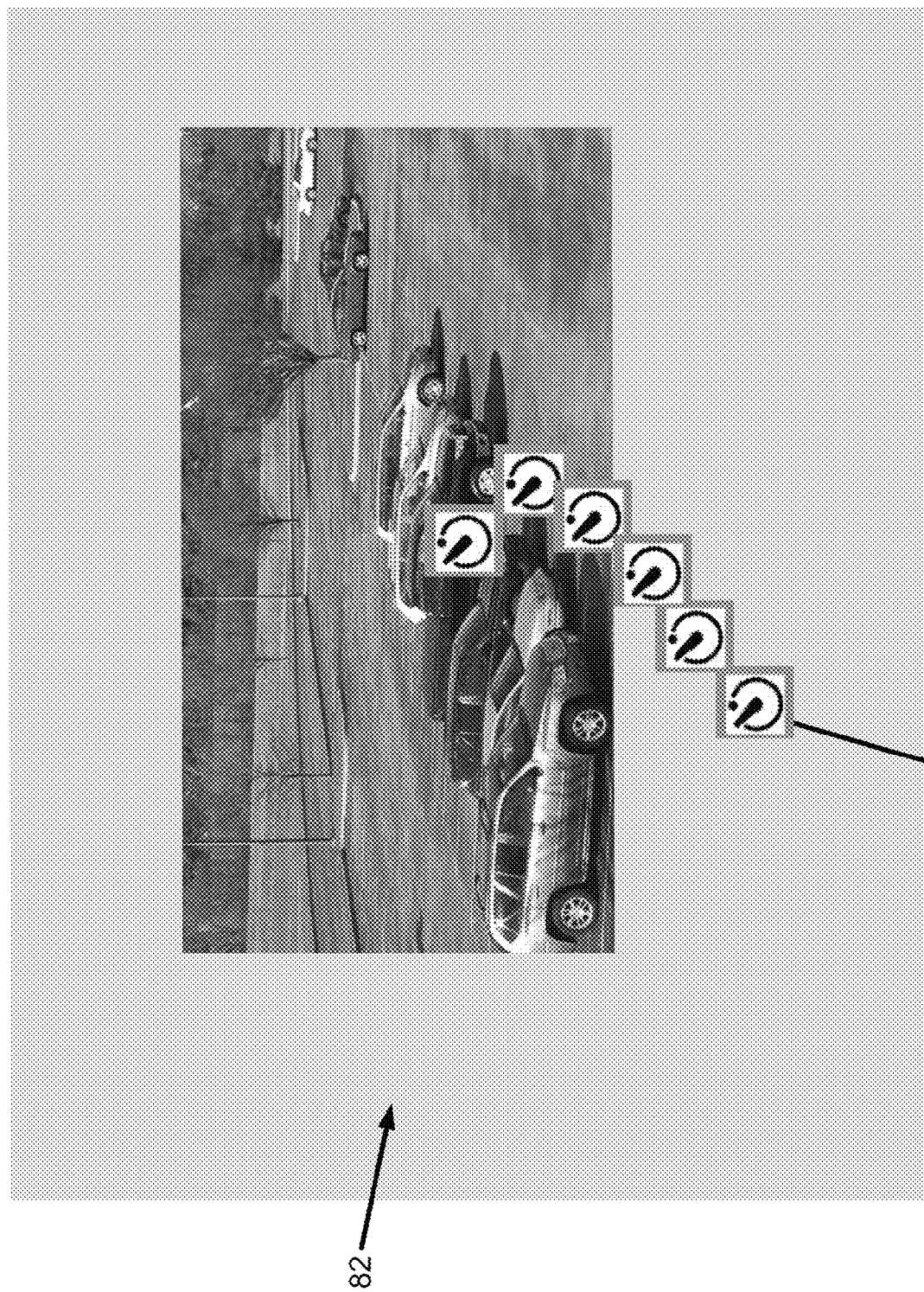
FIG. 8 illustrates a video stream and a mark-up being placed on the video stream by a user.
Figure 9:
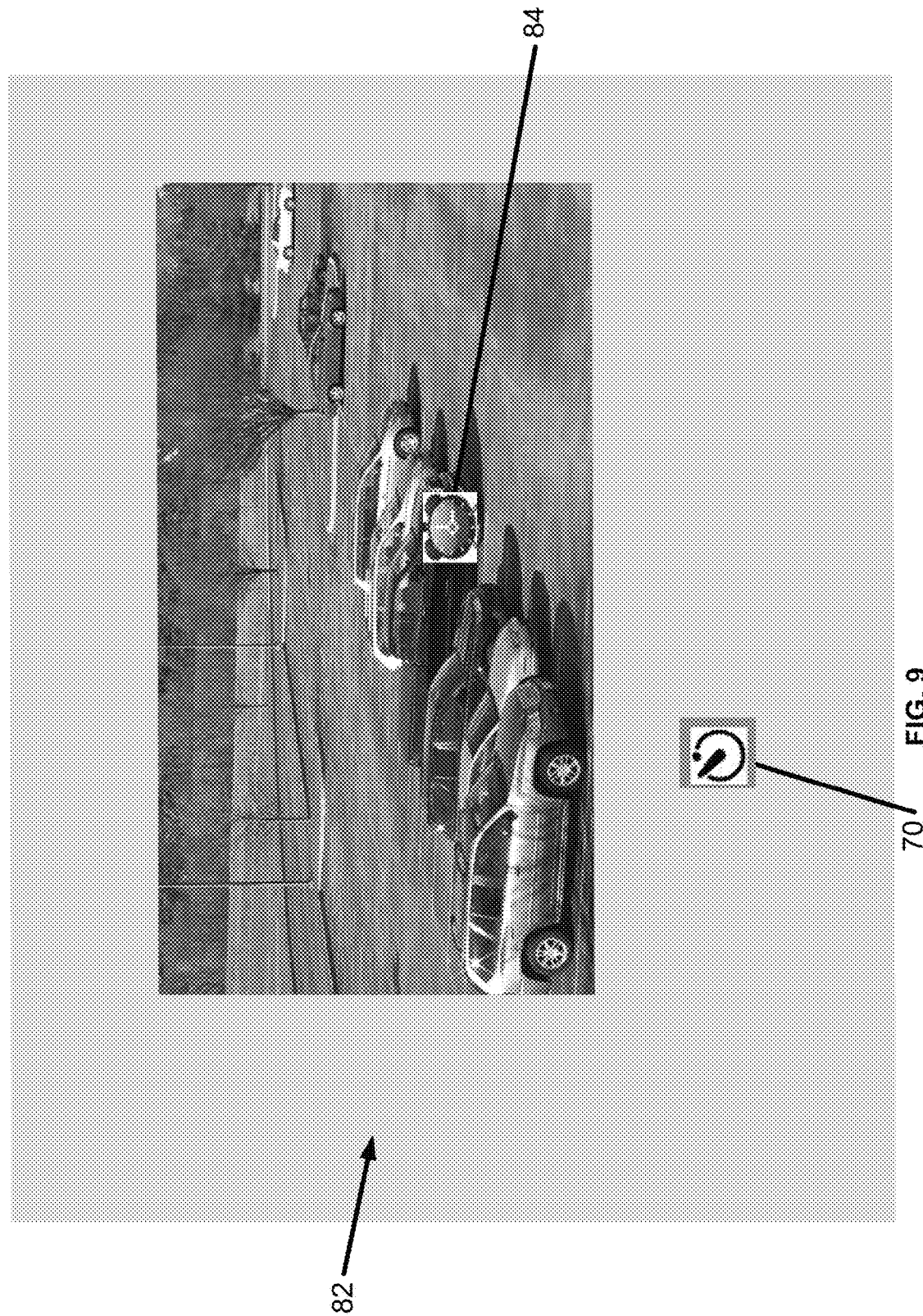
FIGS. 9-12 illustrate a video stream including a mark-up.

After downloading and installing one or more gadgets, a user configures each gadget (at block 80, FIG. 3). Configuring a gadget can include placing a mark-up associated with the gadget at a particular location on a displayed video stream. A user can place a mark-up using a touchscreen 25 and/or peripheral devices 26 (e.g., keyboard, mouse, joystick, stylus, etc.) associated with the computing device 12. For example, as noted above, available gadgets can be displayed as icons within a graphical user interface displaying a video stream (see FIG. 7). In some embodiments, available gadgets are displayed on a bar (e.g., a bottom or side-bar) within the interface. A user can drag and drop a mark-up from the bar onto the video stream also displayed in the interface. For example, as illustrated in FIG. 8, a user can select a gadget icon 70 and drag the icon 70 to a particular position on the displayed video stream 82 to add a mark-up 84 associated with the selected gadget to the selected position (see FIG. 9). Alternatively or in addition, a user can select a gadget icon 70 (e.g., double clock or double tap) to place a mark-up 84 associated with the selected gadget icon 70 at a default position within the displayed video stream 82. The user-selected or default position of the mark-up forms part of the configuration data for a mark-up.

Some mark-ups are associated with additional user-selected parameters, such as text, color(s), functions, etc. In these situations, a gadget can prompt a user for additional input before or after the user positions the mark-up on the video stream. These user selections form part of the configuration data for the mark-up along with the mark-ups position on the video stream.

The configuration data for a particular mark-up is also defined by the metadata needed by the gadget to create and display the mark-up. For example, TABLE 1 below provides sample configuration data for different gadgets. In particular, the last column of TABLE 1 indicates the specific metadata streamed for a particular gadget. For example, a compass gadget described in TABLE 1 displays compass directions, such as north, south, east, and west as a compass mark-up on a video stream (see FIG. 11). When a compass the compass gadget is configured, the image sensor 14 (i.e., the camera) streams metadata that includes current and reference pan and tilt coordinates that are used to provide the compass mark-up (i.e., the configuration data maps particular pan and tilt coordinates to particular compass directions). Therefore, the compass gadget uses the coordinates provided in the metadata to graphically display directions (e.g., east and west or north and south) on the video stream as a mark-up. It should be understood that the metadata associated with a particular gadget can vary from the metadata indicated in TABLE 1 and can vary based on the type of image sensor or data source, a state of the data source, etc.

TABLE 1

| MARK-UP TYPE | APP/GADGET | DESCRIPTION | METADATA |
| --- | --- | --- | --- |
| Security | Privacy Masking Icons | Black boxes or icons that show particular area of interest (e.g., window, credit card terminals, etc.) | Mask coordinates in a frame, type of the mask, text (if any) associated with a mask. |
| Informational | Text box | A text box tied to a position (may contain instructions, such as for an electrician) | Text, text coordinates in frame, pan, tilt, and zoom positions. |
| Informational | Compass | Shows the direction in which the camera/dome is pointing (i.e., N/S/E/W). | Current and reference pan and tilt positions. |
| Diagnostic | Loss of Home position | Indicates to a user that a home position is not good anymore and suggests a rehome operation. | Home position status. |
| Informational/ Security | Object Popup | Specifies information about an object (e.g., speed, suspicion, etc.). | Object identifier and text or other information about the object. |

Accordingly, the configuration data for a mark-up includes the user selections for the mark-up (e.g., position, text, color, etc.) and the metadata needed by the gadget to render and display the mark-up (e.g., camera information, time and date, etc.). The configuration data, or portions thereof, are stored on the computing device 12 (e.g., as part of the downloaded gadget or a separate application configured to interpret data from the camera) and/or at the image sensor 14 (at block 90, FIG. 3). In particular, the gadgets (or a separate software application executed by the computing device 12) can transmit information to the image sensor 14 to inform the image sensor 14 of what metadata is needed based on the mark-ups the user added to the video stream. If the user changes the mark-ups, the image sensor 14 can similarly be informed of the changes. Accordingly, through the mark-ups, users customize the metadata provided by the image sensor 14. If any of the metadata required for a particular mark-up is not available through the image sensor 14, the gadgets (or a separate software application executed by the computing device 12) communicate with the image) can communicate with other systems or devices to request the required information. It should also be understood that in some embodiments, whenever a user configures a gadget, configuration and any historical information is stored on the image sensor 14. Therefore, when a power cycle occurs, the stored information is not lost.

After the configuration data is stored (or requested as necessary), the image sensor 14 streams video data and relevant metadata as defined by the configuration data (at block 100). Most video streaming standards, such as H.264, provide a metadata channel. Therefore, the image sensor 14 can encode the requested metadata and transmit the metadata over the metadata channel.

The computing device 12 receives the video data (representing an static or changing area monitored by the image sensor 14) and the associated metadata and processes both pieces of data to generate a video stream and one or more mark-ups that provide analytical tools for the video stream (at block 110, FIG. 3). For example, in some embodiments, each gadget is configured to decode the metadata and interpret or process the metadata to generate or refresh the mark-ups on the video stream (e.g., generated and refreshed by a separate application executed by the computing device 12).

As noted above, the metadata used with a particular mark-up can be provided by the image sensor 14, the computing device 12 (i.e., the gadget associated with the mark-up), other systems or devices, or a combination thereof. In some embodiments, the gadgets are configured to combine all of the necessary metadata, use the metadata to generate or update a particular mark-up, and store the metadata with the video stream so that the mark-ups can be re-created when a stored video stream is replayed.

After generating each mark-up, the mark-up is displayed on the video stream (e.g., overlaid on the video stream). Each mark-up is displayed at the user-selected location on the video stream or a default position. It should be understood that the mark-ups can take various forms and provide different functionality. For example, each gadget can provide a particular type of mark-up. In general, the mark-ups can include graphical representations, such as shapes (e.g., lines, circles, etc.), text (e.g., informational text or alerts), colors (e.g., shaded areas for a particular purpose or designation), timers, sticky notes (e.g., broadcast messages for security staffs), selectable buttons associated with pre-defined functions, etc.

For example, mark-ups can be used to define sub-areas of an area monitored by the image sensor 14. The marked subareas can define a portion of the video stream where particular personnel or machinery cannot enter (e.g., construction crews cannot dig due to buried utilities) or where particular personnel or machinery must remain. Security personnel can use the mark-up to quickly identify whether a particular object is in a restricted area. In some embodiments, a mark-up can include a graphical representation of an area that has a default or a user-selected size and shape. The mark-up can be at least partially transparent to allow a user to view the video stream behind the mark-up. In other embodiments, the mark-up can be translucent to act as a privacy mask for a particular area of the video stream.

Figure 11:

Similarly, mark-ups can be used to provide directions or points of reference for a video stream. For example, as illustrated in FIG. 11, a one-way street monitored by a particular image sensor 14 can be added as a text-based mark-up 112 to help new security staff familiarize themselves with a monitored area. As illustrated in FIG. 11, these mark-ups can include both a textual description and a graphical representation, such as one or more arrows. For example, for a video stream of an area of a mall, a mark-up can include an arrow that points in one direction and is associated with text that reads "SEARS."

A text-based mark-up 112 can also be placed around particular objects contained in a video stream as notes. For example, security personnel can place a mark-up near an object that has been cleared for security purposes (e.g., a van parked in a lot that is associated with an approved on-site service contractor). These text-based mark-ups 112 can also be added to a video stream to alert security personnel of planned activity in a monitored area (see FIGS. 10 and 11). These mark-ups 112 can be useful for changing shifts of security personnel or large crews of security that require information sharing among multiple individuals.

Figure 10:
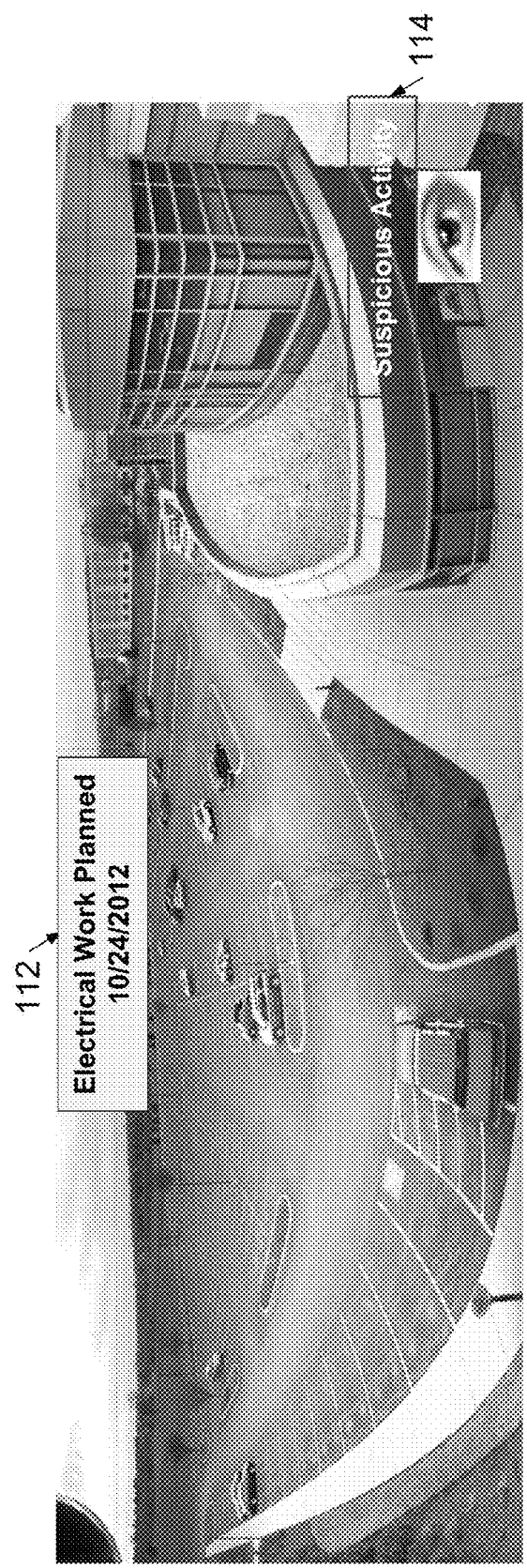
Figure 12:

Mark-ups 114 can also be used to identify and document suspicious activity (see FIG. 10). The mark-up 114 can identify the location of the suspicious activity, a time of the activity, and/or a description of the activity. The suspicious activity can be associated with an unidentified individual, an open door or window, an unidentified vehicle or package, etc. For example, as illustrated in FIG. 12, a mark-up 114 can be manually added to a video stream when security personnel observe an accident in a parking lot. The mark-up 114 can be associated with a timer that records a time of the accident or a time of detection of the accident. The position of the mark-up 114 can identify the location of the accident. Mark-ups identifying suspicious activity can also be associated with timers. The timers can record how long particular suspicious activity (e.g., an unidentified vehicle) has been stationary and under observation (see FIG. 11). For example, the mark-up illustrated in FIG. 7 includes a timer mark-up 116. In some embodiments, a positioned timer mark-up 116 starts counting when the timer mark-up 116 is positioned on a displayed stream. In other embodiments, a user has to select the timer mark-up 116 after placement to start the timer. Once a timer mark-up 116 is running, a user can select the timer mark-up 116 to stop and subsequently restart the timer.

In some embodiments, a mark-up can also include one or more selectable buttons associated with one or more pre-defined functions. For example, a mark-up can include a print button that allows a user to print the current image on the screen (including or excluding the mark-ups) to a printer or a file. A mark-up can also include a button associated with functions for repositioning a camera, turning a particular camera on and off, turning on and off a timer, turning a light or alarm on and off, turning other sensors associated with a particular image sensor (e.g., a temperature sensor, an accelerator sensor, etc.) on and off, executing particular software applications, such as a facial recognition software application, etc. TABLE 1 above also provides additional details regarding different types of mark-ups.

It should be understood that the functionality of a gadget can be divided between the computing device 12 and the image sensor 14. For example, in some embodiments, when a gadget providers a timer mark-up, the image sensor 14 can update the time and provide this information to the gadget (which display the received time). The image sensor 14 can track the actual elapsed time of the timer (e.g., counting up from zero or down from a predetermined time period). Alternatively or in addition, the image sensor 14 can provide a current time, and the gadget can be configured to use the current time to calculate the time for the timer. By using time information from the image sensor 14, the gadget can maintain time information based on the time zone of the image sensor 14, which may be different than the time zone of the computing device 12.

Also, in some embodiments, the gadget can communicate with the image sensor 14 and modify or control the sensor's behavior. For example, the gadget can instruct the image sensor 14 to take an action (e.g., send an alarm or an email). The image sensor 14 can be configured to automatically take these actions (e.g., when a timer expires) and/or based on specific instructions received from the gadget.

It should be understood that a gadget executed by the computing device 12 can be associated with one type of mark-up or multiple types of mark-ups. Also, it should be understood that a mark-up can include multiple features or aspects. For example, a mark-up can be associated with one or more textual descriptions, one or more graphical representations, one or more functions, or combinations thereof.

Also, in some embodiments, a mark-up is tied to a three-dimensional space location that is persistent with respect to time. Therefore, when a gadget generates or updates a mark-up, the mark-up is displayed on the video stream in a persistent location even if the FoV of the image sensor 14 changes (e.g., pans or tilts) (which may include not displaying the mark-up if the persistent location is no longer within the image sensor's FoV). The location of the mark-up can also be vector based, which allows the mark-ups to be resized with the camera FoV and/or the displayed video stream. Furthermore, in some embodiments, the mark-ups do not overwrite the original image stream but are overlaid on the video stream. Therefore, frame data of the video stream is not lost even if a mark-up overlays a particular area of a video stream. A user may also be able to hide a displayed mark-up (e.g., without deleting the mark-up) to view the portion of the video stream under the mark-up. A hidden mark-up may automatically reappear after a particular time or action (e.g., a screen refresh or shift change) or may reappear at the command of a user. Also, as noted above, in some embodiments, a mark-up or a portion thereof can be at least partially transparent such that the video stream overlaid by the mark-up is at least partially viewable. In addition, mark-ups can be organized as layers. Each layer can be tailored for a particular user, type of user, or functionality, such as an "electrical service" layer, an "emergency response services" layer, etc. Therefore, depending on the type of user accessing the video stream, a different layer of mark-ups can be provided and displayed (i.e., some or all mark-ups can be hidden based on the identity of the user).

As described above, the gadgets can be used with live video streams. The gadgets, however, can also be used with historical video streams stored with associated metadata. In particular, the gadgets can be used to analyze stored video data and associated metadata. For example, if a user configured a temperature monitoring mark-up at a specific pan and tilt position of an image sensor (e.g., the position of a machine imaged by the image sensor in a particular FoV), the relevant metadata associated with this mark-up is streamed with the video data and stored with the video data. The gadgets can then be used to create the mark-ups associated with the stored video in a non-real-time manner. In addition, the gadgets can be configured to perform additional analysis based on historical mark-ups, such as providing a graph of temperature versus time during a particular time period (e.g., a day or multiple days).

The metadata can also be stored with the video stream and used to re-create mark-ups or provide additional mark-ups for stored video streams. The stored metadata can also be used to query and perform analysis on stored video streams. For example, metadata associated with mark-ups marking observed accidents or suspicious activity can be quickly identified from stored video stream and used to determine crime patterns or time periods requiring additional security forces.

Metadata used by the mark-ups can also be provided to third-parties that use the metadata to generate further software applications for providing mark-ups and/or performing video analytics. For example, software applications can use the metadata to automatically identify and tag objects. Software applications could also use the metadata to automatically track user-defined changes of state, position, color, etc. within a video stream.

It should also be understood that the gadgets and mark-ups described herein can be used with any type of data stream and is not limited to video streams. For example, the gadgets and mark-ups can be used with thermal data streams, gamma data streams, etc.

Accordingly, embodiments of the present invention provide methods and systems for providing applications or software-based gadgets for a surveillance camera platform. The applications and gadget can be configured to define metadata streamed by a camera and associate the provided metadata with a mark-up displayed are part of a video stream. For example, the metadata can be used to create position-dependent and position-independent mark-ups tied to particular video frames. The camera, such as a PTZ device, streams the selected metadata encoded in or apart from the video data, including supplemental sensor information (e.g., sensors other than the image sensor itself included in or associated with a particular image sensor 14, such as a thermal sensor). The gadget decodes the metadata and processes the metadata to render a mark-up in a visual or other form on the video stream.

Various features and aspects of the invention are set forth in the following claims.

What is claimed is:

1. A method for adding a mark-up to a video stream, the method comprising:
   receiving, with a computing device, a selection of at least one mark-up from a user;
   in response to the selection of the at least one mark-up, transmitting, with the computing device, information to an image sensor, wherein the transmitted information includes a request for metadata associated with the at least one mark-up;
   receiving, with the computing device, the video stream from the image sensor;
   receiving, with the computing device, the metadata associated with the at least one mark-up from the image sensor;
   processing, with the computing device, the metadata to generate a graphical representation of the at least one mark-up for the video stream, wherein the graphical representation includes at least a portion of the metadata;
   displaying, with the computing device, the graphical representation of the at least one mark-up overlaid on the video stream at a user-selected location within the video stream;
   receiving, with the computing device, an updated video stream from the image sensor and updated metadata associated with the at least one mark-up from the image sensor;
   updating, with the computing device, the graphical representation of the at least one mark-up based on the updated metadata; and
   displaying, with the computing device, the updated graphical representation of the at least one mark-up overlaid on the updated video stream.

2. The method of claim 1, further comprising receiving, with the computing device, a selection of the at least one mark-up from a user, downloading a software application associated with the selection of the at least one mark-up from a remote server, and executing the software application with the computing device to process the metadata to generate the at least one mark-up.

3. The method of claim 1, further comprising storing, with the computing device, the video stream and the metadata and replaying the stored video stream and processing the stored metadata while replaying the stored video stream to generate the graphical representation of the at least one mark-up and display the graphical representation of the at least one mark-up overlaid on the replayed video stream.

4. The method of claim 1, further comprising prompting a user to specify a size and shape for the graphical representation of the at least one mark-up.

5. The method of claim 1, wherein processing the metadata to generate the graphical representation of the at least one mark-up includes processing the metadata to generate a textual description included in the graphical representation and further comprising prompting the user to specify text for the textual description.

6. The method of claim 1, wherein transmitting, with the computing device, the information to the image sensor includes transmitting instructions for performing an action.

7. The method of claim 1, wherein processing the metadata to generate the at least one mark-up includes processing the metadata to generate at least one mark-up including a timer to track the amount of time an object appears in the video stream.

8. The method of claim 1, wherein processing the metadata to generate the graphical representation of the at least one mark-up includes processing the metadata to generate at least one mark-up indicating a parameter sensed by at least one sensor separate from the image sensor.

9. The method of claim 1, further comprising, in response to receiving a drag motion through a peripheral device moving the graphical representation of the at least one mark-up from the first user-selected location to a second user-selected location, displaying the graphical representation of the at least one mark-up overlaid on the video stream at the second user-selected location.

10. A system for adding a mark-up to a video stream, the system comprising:
a computing device including a processing unit configured to execute a software application configured to:
receive a selection of the at least one mark-up from a user;
in response to the selection of the at least one mark-up, transmit information to an image sensor, wherein the transmitted information includes a request for metadata associated with the at least one mark-up;
receive the video stream from the image sensor,
receive the metadata associated with the at least one mark-up from the image sensor,
process the metadata to generate a graphical representation of the at least one mark-up for the video stream at a user-selected location within the video stream,
receive an updated video stream from the image sensor and updated metadata associated with the at least one mark-up from the image sensor,
update the graphical representation of the at least one mark-up based on the updated metadata, and
display the updated graphical representation of the at least one mark-up overlaid on the video stream at a user-selected location within the video stream.

11. The system of claim 10, wherein the software application is further configured to transmit configuration data to the image sensor for the graphical representation of the at least one mark-up.

12. The system of claim 10, wherein the software application is further configured to store the video stream and the metadata and replay the stored video stream and process the stored metadata while replaying the stored video stream to generate the graphical representation of the at least one mark-up and display the graphical representation of the at least one mark-up overlaid on the replayed video stream.

13. The system of claim 10, wherein the graphical representation of the at least one mark-up includes a textual description.

14. The system of claim 10, wherein the graphical representation of the at least one mark-up includes a timer to track the amount of time an object appears in the video stream.

15. The system of claim 10, wherein the graphical representation of the at least one mark-up includes at least one selected from the group comprising a privacy mask, a compass, and an object identifier.

16. The system of claim 10, wherein the software application is further configured to automatically determine a position of the graphical representation of the at least one mark-up within the video stream based on a user-selected position of the mark-up and a current position of the image sensor.

17. The system of claim 10, wherein the software application is further configured to automatically hide the graphical representation of the at least one mark-up based on an identity of a user of the software application.

18. The system of claim 10, wherein the software application is further configured to
receive a first adjustable location of the graphical representation of the at least one mark-up from the user, wherein the received first adjustable location is associated with the location in which the graphical representation of the at least one mark-up is overlaid on the video stream;
receive a second adjustable location of the graphical representation of the at least one mark-up from the user, wherein the received second adjustable location is based on where the user drags the graphical representation of the at least one mark-up; and
display the graphical representation of the at least one mark-up overlaid on the video stream in the received second adjustable location when the user drags the graphical representation of the at least one mark-up to the second adjustable location.

\* \* \* \* \*